(12) United States Patent
Atwell et al.

(10) Patent No.: US 8,354,134 B2
(45) Date of Patent: Jan. 15, 2013

(54) RHEOLOGICALLY BALANCED HIGH FIBER INGREDIENT FOR FOOD PRODUCTS

(75) Inventors: William A. Atwell, Champlin, MN (US); Jody L. Mattsen, South Saint Paul, MN (US); Jessica Earling Wellnitz, Minneapolis, MN (US)

(73) Assignee: Cargill, Incorporated, Wayzata, MN (US)

( * ) Notice: Subject to any disclaimer, the term of this patent is extended or adjusted under 35 U.S.C. 154(b) by 965 days.

(21) Appl. No.: 11/317,471

(22) Filed: Dec. 22, 2005

(65) Prior Publication Data
US 2007/0148300 A1    Jun. 28, 2007

(51) Int. Cl.
*A23L 1/053*    (2006.01)
(52) U.S. Cl. .......................................... 426/653; 426/615
(58) Field of Classification Search .................. None
See application file for complete search history.

(56) References Cited

U.S. PATENT DOCUMENTS

| | | | |
|---|---|---|---|
| 5,792,754 A | 8/1998 | Green et al. | |
| 6,025,007 A | 2/2000 | Krawczyk | |
| 6,149,965 A | 11/2000 | van Lengerich et al. | |
| 6,352,733 B1 | 3/2002 | Haynes et al. | |
| 6,468,579 B1 | 10/2002 | Roussel et al. | |
| 6,610,347 B1 | 8/2003 | Onwulata | |
| 6,777,017 B2 | 8/2004 | Porter et al. | |
| 6,936,289 B2 | 8/2005 | Olsen et al. | |
| 7,252,850 B2 * | 8/2007 | Levin et al. | 426/615 |
| 7,618,667 B2 * | 11/2009 | Anfinsen | 426/549 |
| 2004/0266727 A1 | 12/2004 | Brandon | |

FOREIGN PATENT DOCUMENTS
EP    1386546 A1    2/2004

OTHER PUBLICATIONS

New Aleurone Definition Approved, AACC International Report, p. 242/ Sep.-Oct. 2010, vol. 55. No. 5 by Bill Atwell.
United States Department of Agriculture Foreign Agricultural Service, Table 1, Oct. 9, 2009.
Bread Mix Label: Carbsense Foods, Inc., CarbSense(TM) Harvest Wheat Bread Mix.
Bread Mix Label: Ketogenics, Ketongenics' Honey Wheat Low Carb Bread Mix.
Bread Mix Label: Ketogenics, Ketogenics' Low Carb Bread Machine Mix.
Bread Mix Label: Atkins Nutritionals, Inc., Atkins Kitchen(TM) Quick & Easy Bread Mix.
Bread Label: French Meadow Bakery, Woman's Bread(TM)—Date: 1999.
Bread Label: French Meadow Bakery, Healthy Hemp(TM) Sprouted Bread—Date: 2000.
Bread Label: Atkins Nutritionals, Inc., Country White Bread—Date: 2002.
Bread Label: Natural Ovens Bakery, Inc., Original Lo-Carb Bread.
Bread Label: Natural Ovens Bakery, Inc., Golden Crunch Lo-Carb Bread.
Bread Label: Controlled Carb Gourmet, Fiber Rich Bread: Plain.
Bread Label: Controlled Carb Gourmet, Fiber Rich Bread: Garlic.
Bread Label: LUNDS, Low Carb Bread—Date: 2003.
Bread Label: Todd's Organic Garden Bread, Garden Todd's Bread: Cocoa Breakfast Bread.
PCT/US2006/062440 International Search Report; Date of Mailing: May 23, 2007; Applicants: Cargill, Incorporated et al.
PCT/US2006/062440 Written Opinion of the International Searching Authority; Date of Mailing: May 23, 2007; Applicants: Cargill, Incorporated et al.

* cited by examiner

*Primary Examiner* — Lien Tran

(57) ABSTRACT

The present invention is a high fiber blend which includes a stiffening agent and a plasiticizing agent. The blend replaces part of the flour in a dough without substantially affecting the dough's rheological properties. High fiber food products can then be made from the dough, using conventional commercial manufacturing equipment and processes. The blend can be used to produce food products that meet FDA requirements for fiber-related health claims. The present invention is also a method of making the high fiber blend. This method involves measuring a rheological property of the stiffening agent and the plasticizing agent. The stiffening agent and plasticizing agent are then combined, in amounts that will allow the resulting blend to provide a high level of fiber to a food product without substantially affecting the rheological properties of the dough.

17 Claims, 12 Drawing Sheets

Time (Minutes)

Time (Minutes)

RHEOLOGICALLY BALANCED HIGH FIBER INGREDIENT FOR FOOD PRODUCTS

BACKGROUND

Commercial food manufacturers strive to deliver improved food products to the consumer to meet a wide variety of consumer preferences. One such consumer preference is the desire to increase the nutritional value of regularly consumed food products such as breads, rolls, buns and other bakery products. The desire for highly nutritive food products must also be balanced by the consumer's preference for organoleptically appealing food products. The commercial food manufacturer is faced with the challenge of providing highly nutritive food products, such as bakery products, which retain acceptable organoleptic properties such as taste, texture, and appearance, and especially those products that can retain the desired organoleptic properties during the shelf life of the food product.

The nutritional value of a food product, therefore, is something that the commercial food manufacturer would want to promote to the consumer through labeling, advertising, and the like. As with other aspects of food labeling, the U.S. Food and Drug Administration (FDA) has issued regulations regarding the health claims that can be made regarding a food product. Among these regulations are regulations that are specific to the level of nutrients delivered by the food product in order to support the claimed health benefit. In other words, in order for a food product to carry an FDA-approved health claim on the product label or other promotional materials, the food product must consistently deliver a nutrient or a combination of nutrients at defined levels per serving.

Bread is a dietary staple to which many nutritional ingredients have been added. Currently, there are commercially available whole wheat breads meeting the FDA heart health claim requirements regarding whole grain content. Whole wheat contains wheat gluten, and therefore tends to have a less adverse effect on the quality of the bread, particularly on the specific volume and texture of the bread, than non-wheat ingredients. There are also 9- and 12-grain breads, and breads designed to deliver specific nutrients or supplements to meet specific dietary needs, and other similar breads. Although these breads contain nutritive ingredients, the level of a specific nutrient, such as protein or fiber, provided per serving generally falls short of the levels required by the FDA regulations for specific health claim labeling. This is because the high level of nutrients required for making an FDA health claim on a product typically has an adverse effect on the quality of the bakery product, particularly on the specific volume and texture of the bakery product.

Dietary fiber is a nutrient that food manufacturers strive to increase in food products, but which typically has deleterious effects on the food product. Dietary fiber is generally divided into two categories, soluble and insoluble, based on the solubility of the fiber in water at room temperature. Increasing soluble fiber intake improves digestion by providing nutrients to intestinal flora and/or lowering cholesterol. Insoluble fiber promotes overall health by providing indigestible bulk to food products.

However, the addition of high levels of fiber to food products is known to adversely affect the organoleptic properties of food products. High fiber food products can have a dry, tough, chewy, or dense texture, making them less appealing to consumers. In fact, the level of dietary fiber needed to meet an FDA fiber claim in a bakery product is often so high that a dough containing the requisite amount of fiber is simply unprocessable on a commercial manufacturing line, usually because the dough is either too stiff or too plastic as a result of the fiber ingredient added. Therefore, not only are high fiber products difficult to prepare from an organoleptic standpoint, they are difficult to prepare from a commercial manufacturing standpoint as well.

The commercial food manufacturer is therefore faced with the challenge of providing high fiber bakery products that retain acceptable organoleptic properties such as taste, texture, and appearance, and that can readily be made using conventional commercial manufacturing equipment and processes.

SUMMARY OF THE INVENTION

The present invention is directed to a high fiber blend for making food products. The high fiber blend replaces part of the flour used to make a dough, thereby providing a high level of fiber to the food product made from the dough. The blend, which includes a stiffening agent and a plasticizing agent, provides a high level of fiber without substantially affecting the rheological properties of the dough. Therefore, the blend allows high fiber food products to be made using conventional commercial manufacturing equipment and processes. The blend can be used to produce organoleptically pleasing food products that contain sufficient amounts of fiber to meet FDA requirements for fiber-related health claims.

The present invention is also directed to a method of making a high fiber blend for food products. This method involves measuring a rheological property, such as peak resistance, of a stiffening agent and a plasticizing agent. The stiffening agent and plasticizing agent are then combined to create the high fiber blend. The relative amounts of stiffening agent and plasticizing agent are selected such that the resulting blend is able to provide a high level of fiber to a food product, without substantially affecting the rheological properties of the dough from which the food product is made.

The present invention is also directed to a premix made of the high fiber blend and vital wheat gluten. The premix is suitable for use in a one-to-one replacement on a weight percent basis of some of the flour in the dough formula.

DETAILED DESCRIPTION

Figure 1:
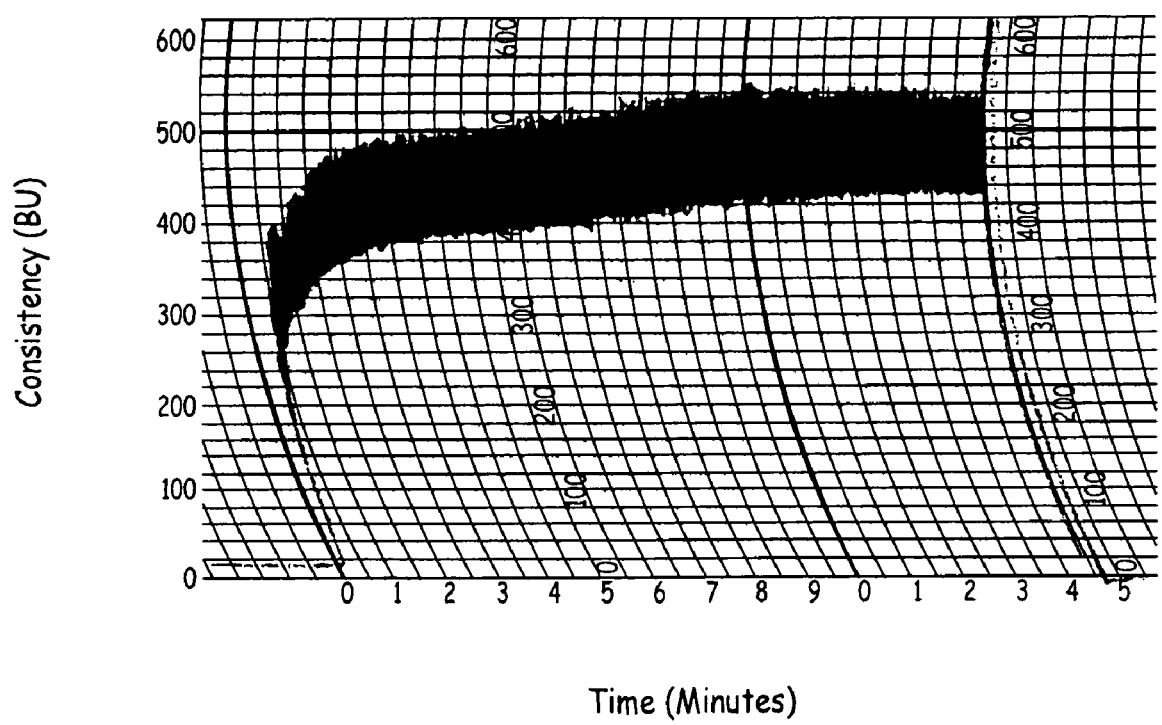
FIG. 1 is a Farinograph® curve of a control dough made with 100% flour at 65% absorption.

The present invention is directed to a high fiber blend that provides the desired level of dietary fiber to a food product, such as a bakery product, and that can be used in a commercial manufacturing process without requiring significant adjustment of the water content or other ingredients of the product because of the high fiber content. The bakery products made with the high fiber blend of the present invention have desirable organoleptic properties, such as specific volume and texture, similar to those properties of a conventional bakery product that does not contain added fiber.

It has been surprisingly discovered that by using a combination of dietary fiber ingredients, the typical adverse effects of having a high level of fiber can be alleviated, resulting in a product that is readily made using a conventional commercial manufacturing process. Products made in accordance with the present invention have specific volumes and textures that are similar to the specific volume and texture of a control product made without the added high fiber blend. Preferably, product made in accordance with the present invention have specific volumes of at least about 4.0 cc/g or higher, and include high levels of fiber, preferably about 5% by weight or higher.

In addition, the method of the present invention can be used to significantly increase the amount of fiber that can be added to a product formulation substantially without adverse effects on the processing of the product or the finished product attributes. The method of the present invention also enables the use of fiber ingredients that previously could not be used or could only be used in limited amounts due to their drastic adverse effects on dough rheology.

The addition of fiber to replace a portion of the flour content in a bakery product formula to achieve a certain fiber level in the product can have numerous deleterious effects on the dough and the final product. First, because the fiber is used to replace a portion of the flour, the total gluten level drops, since wheat flour naturally contains gluten. Second, since there are many different types of dietary fiber available for use in food products, it is difficult to predict the effects a certain type of fiber may have on the dough or on the final product.

These problems have to date required commercial manufacturers to make numerous significant changes in product formulations and processing in order to make bakery products that meet the FDA's current requirements for dietary fiber sources, and that are comparable to conventional bakery products. Even with these changes, there is a continuing need for fiber ingredients that can be added to a dough formulation at high levels to provide the FDA's current requirements for dietary fiber, but without substantial changes to the dough's rheological properties, and therefore, the processing parameters of the high-fiber containing dough.

When fiber ingredients are added to dough, major issues with processing and final product quality can arise. Due to the hygroscopic nature of fiber, mixing times often must be extended to assure the fibers are hydrated and incorporated into the dough. Additionally, since the fiber is usually non-functional with respect to gas holding ability, the dough will not be able to retain as much gas, so the final product specific volumes may be lower and product textures may be more dense as compared to control products. If the dough becomes significantly more stiff or more flowable upon the addition of one or more fiber ingredients, it may be difficult to sheet the dough and form it prior to baking. Processing equipment used to divide the dough into portions (i.e., dough dividers) is often affected by dough rheology, and weight changes may occur leading to improperly sized and weighed product. Bake times can also be affected since the water in the dough is bound differently due to the incorporation of the fiber ingredient. Since bake times can be affected, final product quality parameters such as browning can also be adversely affected.

Commercially, when a fiber ingredient is incorporated into a dough, it is often necessary to add back the functional protein (i.e., gluten) that is removed, as will be further described below, adding an additional expense and variation to the formulation. Additionally, to counteract the change in rheology caused by the addition of the fiber, water is either added or removed from the dough formula. With fibers that have radical effects on rheology or for those used at high levels (or both), a large change in water level is required. This water level adjustment is usually determined experimentally with a control formula dough on a commercial scale. In the case where excess water is added, it takes longer to bake the water out of the dough to convert it to bread during the baking process, necessitating changes in bake times and/or temperatures. Conversely, when water is removed, bake times may be reduced. However, for some systems, if the negative effects of the fiber on dough rheology and gas holding properties is too severe, even adjustments as described herein will be insufficient to produce a processable dough and hence a good quality final product.

By using the product and process of the present invention, it is now possible to utilize, on a commercial scale, a significant number of fiber sources, at relatively high levels, without significantly adversely impacting the rheological properties of the dough. As such, commercial food manufacturers can attain the desired fiber levels in bakery products, without the serious adverse effects on dough rheology and processing as previously encountered. Preferably, commercial food manufacturers can use the present invention to make high fiber products without needing to change the water level in the products during manufacture, as compared to a control product.

There are numerous fiber sources suitable for use in food and bakery products. As those skilled in the art will understand, the teachings of the present invention can be used with virtually any fiber source that is suitable for consumption, at levels that meet or exceed current US FDA requirements for being a "good source of fiber" or an "excellent source of fiber" in a bakery product.

Suitable fibers include, but are not limited to, the following: saccharides, such as mono-, di-, oligo-, and polysaccharides in general; cottonseed, soy, sunflower and other oilseed fibers; wheat bran, oat bran, cereal aleurone and other cereal fibers; derivatized and native celluloses, xylans, pentosans, hemicelluloses, gums, such as gum Arabic, pectin, guar, carageenan, xanthan, and locust bean gum, and other non-starchy polysaccharides; alginates; inulin and fructooligosaccharides (FOS), including fungal FOS; polydextrose; arabinogalactan; arabinoxylan; barley beta fiber; psyllium; the USDA's "Z-trim" fat substitute and other fiber-based fat substitutes;

retrograded, resistant, or slow degrading starches; glucans, such as beta-glucan and fungal beta glucan, and including encapsulated beta-glucan; chitin; chitosan; citrus fiber; corn fiber; seed based fibers; mannans; sugar beet fiber; malt flour; cocoa hull fiber; spent brewer's grains; malt sprouts, flax meal; canola meal; tapioca fiber, rice hull fiber; barley straw flour; fermented wheat fiber; and combinations thereof. The fiber sources can be in either powdered or particulate form.

As used herein, the expressions "control product" or "conventional product" shall be used to refer to products to which no additional fiber ingredients are added, so that the flour content of the control or conventional product is considered 100 Bakers' percent. All percentages are given as weight percent unless indicated otherwise.

As used herein, the term "bakery product" shall refer to any product incorporating flour, including, but not limited to, breads, rolls, buns, bagels, pretzels, pizza or similar crusts, tortillas, pita bread, foccacia, English muffins, donuts and "cakey" brownies, which are baked or otherwise processed with heat to set the finished product structure.

Dough Properties

The properties of bread and other bakery products are predominantly determined by the properties of the dough. The dough properties, in turn, are determined by the dough ingredients and by how the dough is processed. The most basic dough ingredients are wheat flour, water, salt, and a leavening system, such as yeast, chemical leavening agents, or a combination of both yeast and chemical leavening agents.

Upon mixing water with the flour and the leavening system, the flour particles become hydrated, and the shear forces applied by mixing cause wheat gluten protein fibrils from the flour particles to interact with each other and ultimately form a continuous gluten matrix.

Furthermore, as the dough is mixed, air is incorporated in the dough, creating air cells throughout the dough. When carbon dioxide gas is generated by the leavening reaction in the dough, the carbon dioxide first goes into solution. As the water in the dough becomes saturated with carbon dioxide, carbon dioxide being generated by the leavening migrates into the air cells in the dough. The number and stability of the air cells in the dough is determined by the quality of the gluten matrix and the number of air bubbles initially included.

A well-developed wheat gluten matrix results in a dough that can retain the carbon dioxide generated by the leavening system, and therefore deliver the desired specific volume in the final baked product.

Replacing some of the flour and adding non-glutenaceous ingredients, such as fiber, to the dough interferes with the ability of the gluten to form a continuous matrix during mixing. The non-glutenaceous ingredients may compete for the moisture in the dough, thereby hindering the formation of the gluten matrix. In addition, the non-glutenaceous ingredients may occupy space in the dough and physically limit the gluten-gluten interactions required to form the gluten matrix. Furthermore, the non-glutenaceous ingredients may serve as air cell nucleation sites and may cause large air pockets to form in the dough. Gas generated by the leavening action will preferentially migrate to the air pockets rather than remaining distributed in the smaller air cells that are more evenly dispersed through the dough, creating an undesirable texture in the final bakery product. Therefore, the advantages of adding non-glutenaceous ingredients to the bread, such as fiber ingredients, must be balanced with the deleterious effects such ingredients may have on the gluten matrix, the overall dough structure, and the resulting baked product quality.

Gluten is a naturally occurring protein in wheat flour. By reducing the flour content, the gluten content of the dough is also reduced. Adding gluten to the dough formula compensates for the loss of gluten from flour and provides the necessary structure and stiffness to the dough. However, adding too much gluten results in a highly elastic bakery product that does not demonstrate the desired properties. Generally, when wheat flour is replaced with a non-glutenaceous ingredient, vital wheat gluten must be added in quantities necessary to keep the total gluten content (i.e., the gluten native in the wheat flour and the added vital wheat gluten) of the product constant. In cases where the vital wheat gluten is not as functional (i.e., able to retain leavening gas) as the native gluten in wheat flour, it is necessary to add somewhat elevated levels of wheat gluten.

In accordance with the present invention, wheat gluten is added to the formula to compensate for the gluten reduction concomitant with the flour reduction. Preferably, for every 1% by weight reduction of flour-based protein in the formula, between about 1% to about 2% by weight of vital wheat gluten is added to the formula.

The amount of gluten added must be balanced with the amount of fiber added, due to the non-glutenaceous behavior of fiber. Typically, dietary fiber sources have a high water absorption capacity. Insoluble fibers absorb the limited amount of water in a dough system, which stiffens or hardens the dough. Some highly soluble fibers can go into solution in the limited amount of water in the dough, thereby plasticizing the dough by effectively increasing the solvent level in the dough system. Other soluble fibers cannot go into solution as readily, and may end up actually stiffening the dough, rather than plasticizing it. These varying effects of the fiber on the dough are also reflected in the final product, which can suffer from the less than optimal dough rheology due to the added fiber ingredient. These variations also make the dough difficult to process commercially without major adjustments to the formula, for example, by adding more water, or to the processing conditions, such as mixing or line processing speeds.

In accordance with the present invention, a dough stiffening fiber ingredient is combined with a dough plasticizing fiber ingredient to prepare a dough that has rheological properties substantially similar to a control dough that does not contain added fiber. In some embodiments, a plurality of dough stiffening agents and/or dough plasticizing agents can be used.

To optimize the use of these fiber ingredients, the effects of a particular fiber ingredient on the dough's rheological properties are monitored to ensure that the water relationships (i.e., absorption) of the dough remains constant and within a processable range. By balancing the types of fiber ingredient used, the dough can be made, processed, and baked using the same manufacturing equipment and parameters as a conventional bread.

Rheological properties of dough products are usually measured by evaluating the viscoelastic properties of the dough. One instrument used to measure the viscoelastic property is the Farinograph® instrument, available from C.W. Brabender Instruments, Inc., 50 East Wesley Street, South Hackensack, N.J. The Farinograph® instrument measures the resistance of the dough to mechanical mixing. The resistance is recorded as a curve on a graph. The Farinograph® curve provides the useful information regarding the dough strength, mixing tolerance, and absorption (water holding) characteristics of the product being evaluated. The resistance is measured in Brabender units (BU).

As will be appreciated by those of skill in the art of commercial dough and bakery product manufacturing, the rheological properties of the dough must be consistent and must fall within certain parameters in order to be able to be successfully processed on an industrial processing line. Changing processing parameters to adjust for product variations is a time- and resource-consuming endeavor, and often requires significant line down-times in order to adjust and correct for processing variations. For example, when the amount of water or moisture-containing ingredients needs to be adjusted, the manufacturer needs to ensure that microbial safety standards are met in the processing facility as well as in the products being made.

The dough made in accordance with the present invention, containing the high fiber blend of the present invention, does not require the addition of water or a significant adjustment of processing conditions as compared to a control dough in order to be made into a suitable dough and bakery product.

The high fiber blend product of the present invention is designed to enable a commercial manufacturer to use the fiber blend in a one-to-one replacement of some of the flour to make a high fiber bakery product without requiring the manufacturer to adjust the water, plasticizer or stiffener content, or to significantly alter the processing parameters typically associated with such replacement. As used herein, the expression "one-to-one replacement" shall be defined as reducing the flour in the dough formula by a certain amount and replacing it with the same amount, by weight percent, of the fiber blend. This permits the commercial bakery product manufacturer to make bakery products with any desired level of added fiber, preferably up to about 40%, more preferably between about 5% and 35%, and even more preferably between about 15% and 25%, without requiring significant changes in the manufacturing process or the product formula.

The high fiber blend product of the present invention utilizes a combination of water absorption characteristics of various fiber ingredients to balance out the overall effects of the fiber blend on the rheological properties of the dough. By balancing absorption characteristics, virtually any fiber ingredient can be used in a fiber blend product in accordance with the present invention.

To make a rheologically balanced high fiber blend product in accordance with the present invention, the water absorption characteristics of the desired fiber ingredients must be determined. The present invention is further directed to a method for determining the water absorption characteristics of the fiber ingredient and balancing those characteristics with another fiber ingredient having different water absorption characteristics. In accordance with the present invention, a method based on the Farinograph® instrument is used to determine the water absorption characteristics of the desired fiber ingredient. This method is described in Example 1 below.

EXAMPLE 1

Figure 2:
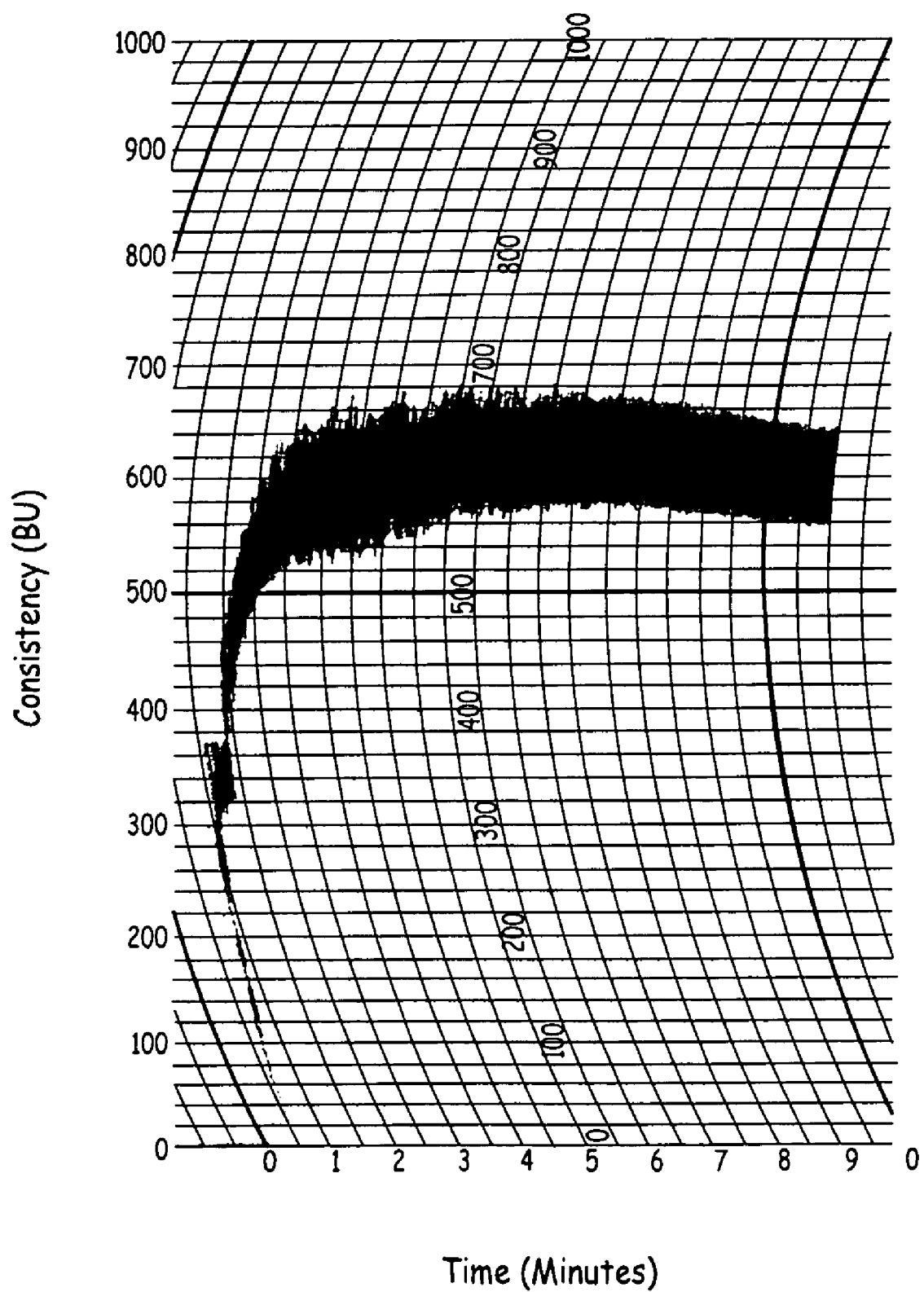
FIG. 2 is a Farinograph® curve of a dough made with 10% aleurone and 90% flour at 65% absorption.
Figure 3:
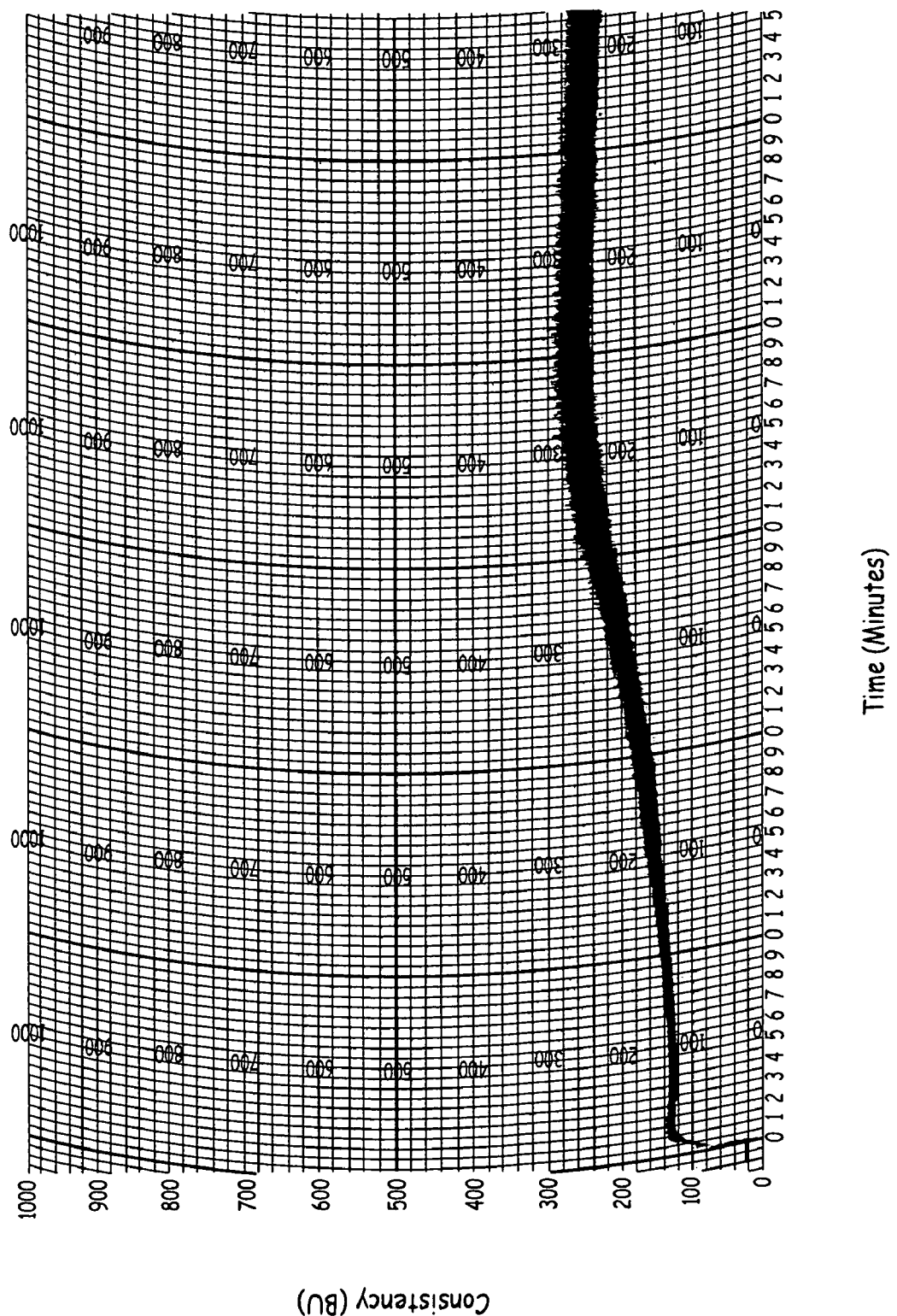
FIG. 3 is a Farinograph® curve of a dough made with 10% inulin and 90% flour at 65% absorption.

To design a rheologically balanced high fiber premix for breads and similar products, it is first necessary to measure the effects of the various fiber ingredients on dough rheology. This is accomplished with the Farinograph® instrument. By replacing 10% of the flour in a flour-water dough with the fiber ingredient and maintaining absorption at a constant level, it is possible to determine how much the rheology is affected by the various fibers relative to each other and relative to the Farinograph® curve of a reference flour (FIG. 1). Some fibers will yield doughs with higher peak Brabender Unit (BU) values (FIG. 2) than the reference flour and will hence stiffen the dough. Others yield lower peak BU values and hence plasticize the dough (FIG. 3).

Farinograph® Instrument Method

The absorption of the flour is determined using 480 g of dough. The flour moisture is on an "as is" basis. The ingredients are dry blended for 1 minute with the water being added in its entirety within 30 seconds.

Farinograph® instrument conditions:

300 gram bowl

Bowl temperature: 77° F.

Water temperature: 70° F.

Farinograph® instrument rpm: 63 rpm

Once the absorption has been established, as shown in FIG. 1, where the curve is balanced on the 500 BU line, 10% of the flour is replaced with the fiber ingredient of interest. The amount of water is kept constant and the Farinograph® instrument is run until a peak has been determined. The absorption of the flour in these examples was 65%.

|  |  | Baker's Percent |
|---|---|---|
| Control: | Artisan bread flour | 100 |
|  | Water (65% abs) | 65 |
| Samples: | Artisan bread flour | 90 |
|  | Sample Fiber Ingredient | 10 |
|  | Water | 65 |

The rheological effect information gathered by this method, as shown in Table 1, enables the formulation of rheologically balanced high fiber premixes in accordance with the present invention. In general, high fiber blends and premixes made in accordance with the present invention will have peak resistance values of between about 100 BU greater than the control BU value and about 100 BU less than the control BU value. Preferably, high fiber blends and premixes made in accordance with the present invention will have peak resistance values of between about 50 BU greater than the control BU value and about 50 BU less than the control BU value. More preferably, high fiber blends and premixes made in accordance with the present invention will have peak resistance values of between about 25 BU greater than the control BU value and about 25 BU less than the control BU value.

TABLE 1

Farinograph ® Instrument Parameters for High Fiber Ingredients in Combination with Flour (10:90)

| Ingredient | Peak BU | Peak Width (BU) | Peak Time (min) | Arrival (min) | Departure (min) | Stability (Min) | MTI** (BU) |
|---|---|---|---|---|---|---|---|
| Arabinogalactan[1] | 230 | 50 | 70 | 53 | 94* | 41 | 10 |
| F97 Inulin[2] | 260 | 40 | 40.5 | 31.5 | 60 | 28.5 | 20 |
| Inulin-Standard[3] | 270 | 50 | 38 | 29 | 45* | 16 | 10 |

TABLE 1-continued

Farinograph ® Instrument Parameters for High Fiber Ingredients in Combination with Flour (10:90)

| Ingredient | Peak BU | Peak Width (BU) | Peak Time (min) | Arrival (min) | Departure (min) | Stability (Min) | MTI** (BU) |
|---|---|---|---|---|---|---|---|
| Polydextrose[4] | 270 | 50 | 40 | 30 | 54* | 24 | 10 |
| Sugar[5] | 330 | 60 | 8.5 | 3 | 30.5 | 27.5 | 20 |
| Gum Arabic[6] | 430 | 60 | 26.5 | 22.5 | 37.5 | 15 | 20 |
| Inulin-LCHT[7] | 450 | 100 | 16 | 11.5 | 27.5 | 16 | 30 |
| Actistar ™ RT[8] | 500 | 120 | 8.5 | 1.5 | 20 | 18.5 | 40 |
| Flour[9] (Control) | 510 | 100 | 10.5 | 3 | 20 | 17 | 20 |
| Cottonseed Fiber[10] | 550 | 100 | 8 | 1.5 | 24.5 | 23 | 20 |
| Soy Fiber (SF)[11] | 590 | 110 | 8 | 1 | 22.5 | 21.5 | 20 |
| Aleurone[12] | 630 | 100 | 5.5 | 2 | 12 | 10 | 40 |
| Joshi (Corn Bran)[13] | 700 | 120 | 5.5 | 1.75 | 9.5 | 7.75 | 90 |
| Oat fiber[14] | 740 | 160 | 7.5 | 2.25 | 20 | 17.75 | 60 |
| Soy Cotyledon fiber[5] | 880 | 190 | 8 | 3 | 27 | 24 | 20 |
| Psyllium[16] | >1000 | | | | | | |

*Longer curves would be necessary to find the actual departure times.
**Farinograph ® Instrument Mixing Tolerance Index
[1]Larex Inc., MN
[2]Oliggo-Fiber ™ F97, Cargill, Inc., MN
[3]Oliggo-Fiber ™ standard, Cargill, Inc., MN
[4]Sta-Lit ® III 7, Tate and Lyle, IL
[5]Granulated sugar, Cargill, Inc., MN
[6]Nutraloid Arabic Spray Powder, TIC, MD
[7]Oliggo-Fiber ™ LCHT, Cargill, Inc., MN
[8]C*Actistar Actistar ™ RT (resistant starch), Cargill, Inc., MN
[9]Cargill "Progressive Baker Artisan Bread Flour", Cargill, Inc., MN
[10]I7C, Just Fiber, NY
[11]Soybean Hull Fiber, Fibred, MD
[12]GrainWise ™, Cargill, Inc., MN
[13]MaizeWise ™, Cargill, Inc., MN
[14]Hesco, SD
[15]Ingredient in development, Cargill, Inc., MN
[16]Psyllium blond seed husk powder 40 mesh, BI Nutraceuticals, CA To effectively replace flour, however, it is also necessary to supplement the premix with an amount of vital wheat gluten equaling the amount of protein lost by replacing the flour with a fiber ingredient.

For example, if a flour contains 12% protein, for every 10% of the flour replaced by a fiber ingredient, 1.2% of flour protein has been removed from the system. Since vital wheat gluten (VWG) is normally only about half as functional as the native gluten it replaces, it is added as a component of the premix at about double the level required to replace the removed flour protein to maintain constant functionality. The amount of VWG added can vary significantly, however, depending on the functionality of the flour protein replaced and the vital wheat gluten itself. The fiber ingredients (stiffening and plasticizing) are added to the premix formula at a level of 100% minus the gluten percentage in a ratio required to balance the total formula rheology.

Figure 4:
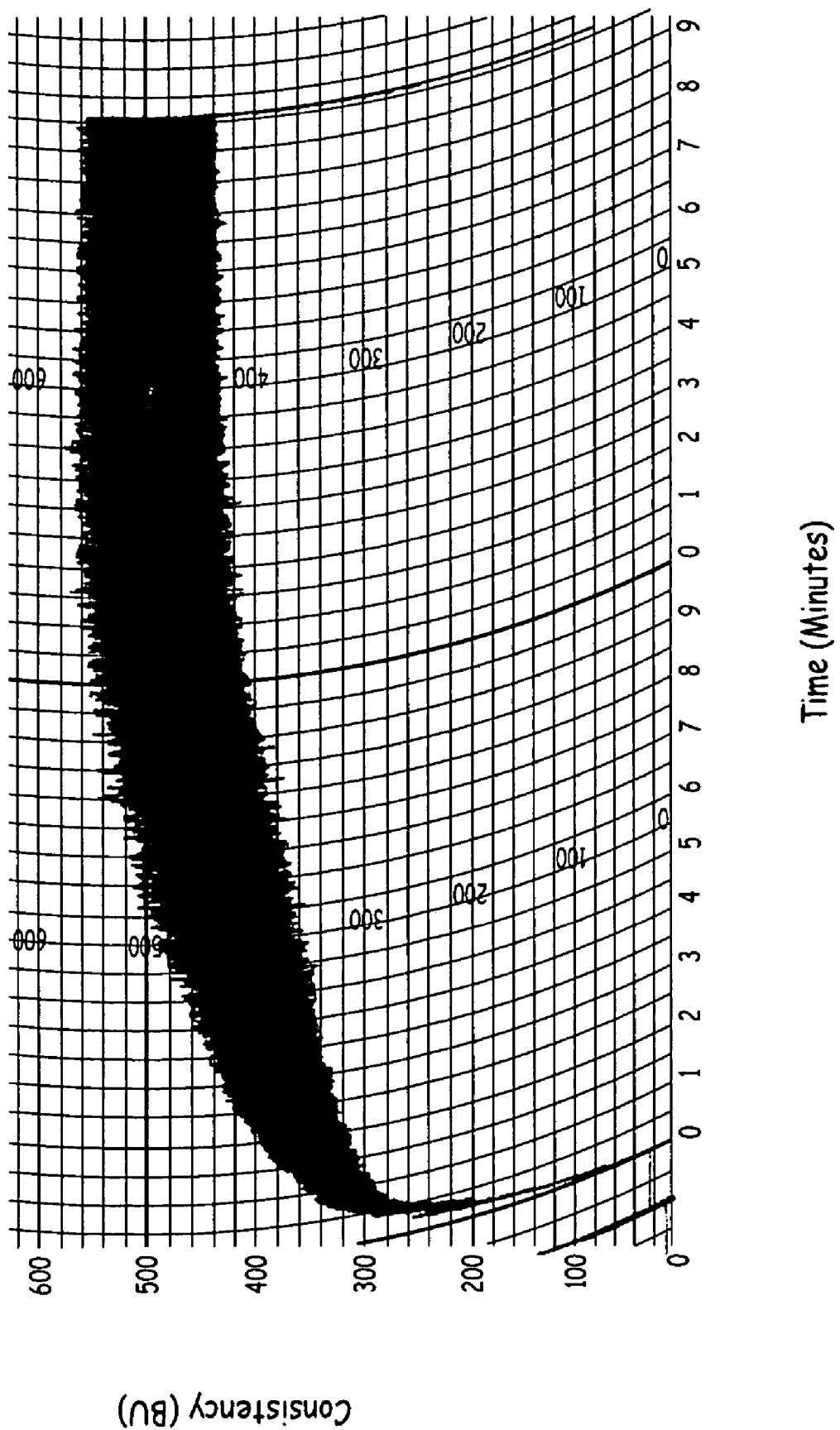
FIG. 4 is a Farinograph® curve of a dough made with 25% premix and 75% flour at 65% absorption, where the premix was a rheologically balanced blend of aleurone, inulin, and VWG.

To make a premix using the rheologically balanced high fiber blend, the final step is to identify the right blend of gluten, stiffening fiber and plasticizing fiber to yield a high fiber premix that does not significantly affect dough rheology when it replaces a portion of the flour in the formula. The VWG percentage in the premix and the total level of fibers are determined as described above. An approximate desired total dietary fiber (TDF) content of the finished bread is then chosen. A practical TDF content is one between the low end of a desired fiber level range (e.g., 10% of the US FDA's Recommended Daily Allowance or Daily Reference Value, or RDA/DRV—a good source of fiber) and the high end of the range (e.g., 20% of the RDA/DRV—an excellent source of fiber), with the current RDA/DRV for fiber being 25 grams, in the finished product to assure replacement levels of both the gluten and the fiber blend are optimal. When the RDA/DRV level is set, the corresponding flour replacement level is used to determine the ratio of the stiffening and plasticizing fibers in the premix. This is determined experimentally using the Farinograph® instrument method so that the water requirement of the original flour is duplicated, as shown in FIG. 4.

Aleurone-Inulin Premix

In this example, the following high fiber blend in a premix form was determined to be suitable for use on a commercial scale.

| Premix 1 Composition | |
|---|---|
| VWG | 20% |
| Aleurone | 52% |
| Inulin-Standard | 28% |

The total dietary fiber content of this premix is about 42%. To produce a. "good source of fiber"-containing bread, the manufacturer would replace 16% of the flour in the formula with this premix. To produce an "excellent source of fiber"-containing bread, the manufacturer would replace 34% of the flour in the formula with this premix.

EXAMPLE 1A

This example demonstrates the effects on rheology and quality of removing inulin or aleurone from the rheologically balanced high fiber blend described in Example 1. These non-balanced premixes clearly demonstrate the effects of the single fiber ingredient on the rheological properties of the dough.

| Premix 1 Composition with Inulin Removed: | |
| --- | --- |
| VWG | 18% |
| Aleurone | 82% |

Figure 5:
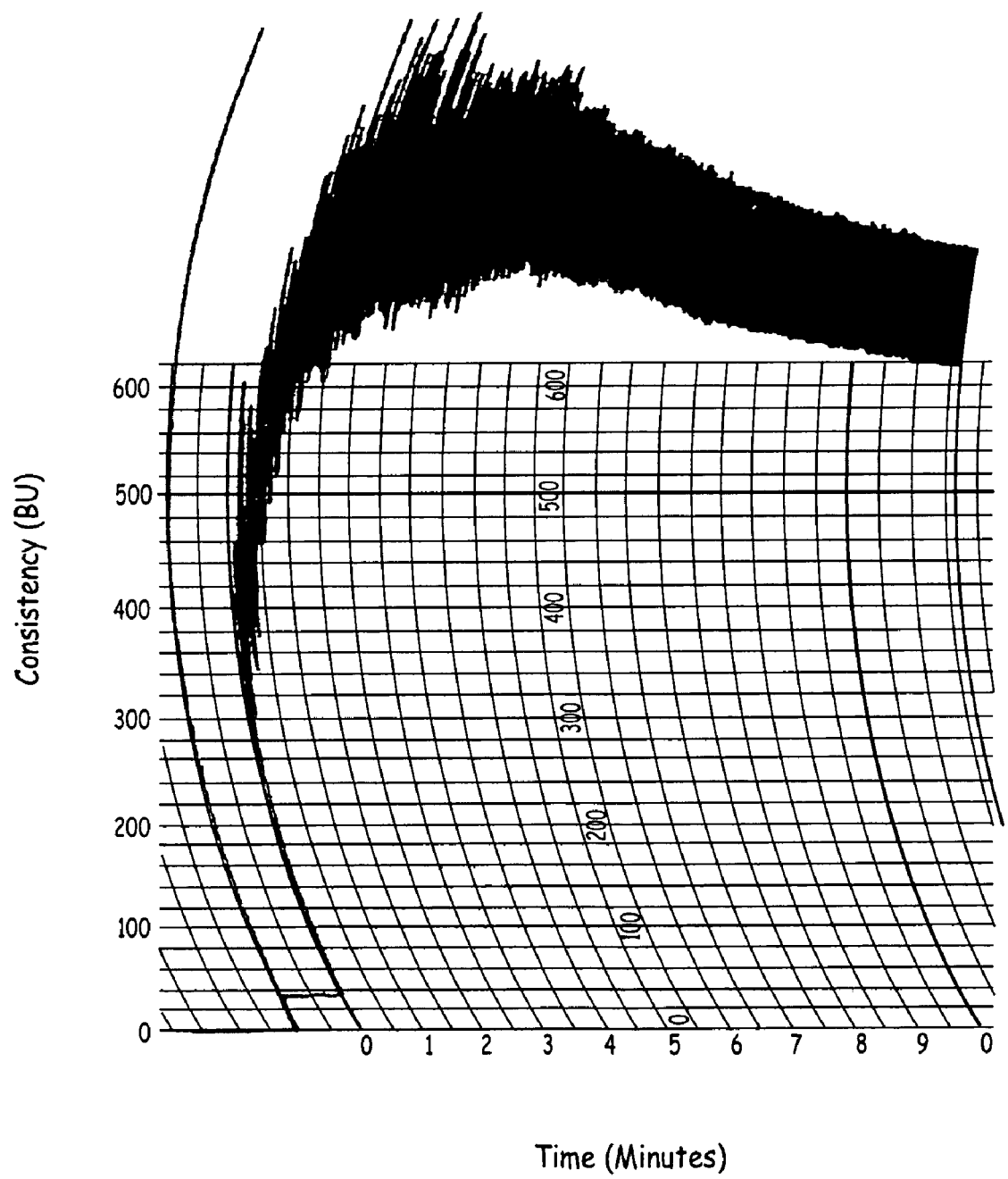
FIG. 5 is a Farinograph® curve of a dough made with 18% premix and 82% flour at 65% absorption, where the premix was a non-balanced blend of aleurone and VWG.

The total dietary fiber content of this premix is about 42%. To produce a "good source of fiber"-containing bread, 18% of the flour in the formula was replaced with this premix. The results are shown in FIG. 5, which shows that the Farinograph® curve is significantly higher than the reference line at 500 BU.

| Premix 1 Composition with Aleurone Removed: | |
| --- | --- |
| VWG | 18% |
| Inulin-Standard | 82% |

Figure 6:
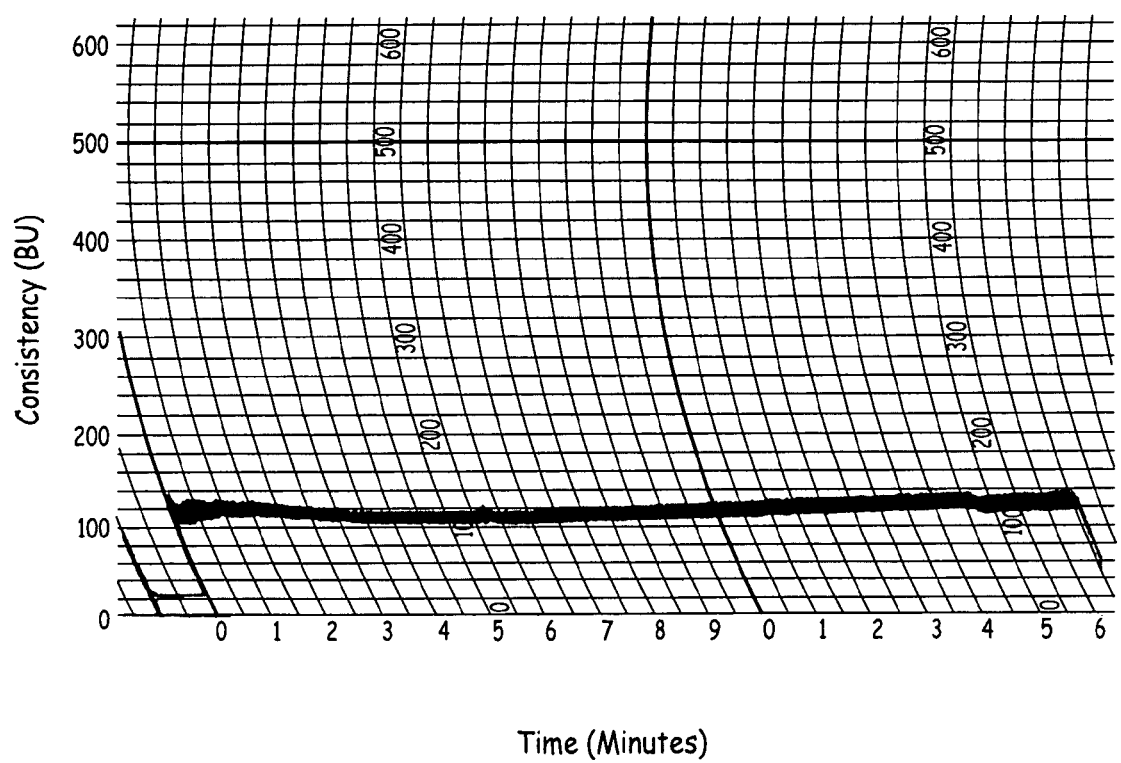
FIG. 6 is a Farinograph® curve of a dough made with 13% premix and 87% flour at 65% absorption, where the premix was a non-balanced blend of inulin and VWG.

The total dietary fiber content of this premix is about 59%. To produce a "good source of fiber"-containing bread, 13% of the flour in the formula was replaced with this premix. The results are shown in FIG. 6, which shows that the Farinograph® curve is significantly lower than the reference line at 500 BU.

Breads were baked using the rheologically balanced high fiber premix of the present invention and were compared to the non-balanced fiber premixes using the bread formula in Table 2 and the following processing procedures.

TABLE 2

Formulas for High Fiber Breads

| Ingredient | Baker's Percent |
| --- | --- |
| Wheat flour, enriched[1] | 100-value in Table 3 |
| Premix | See Table 3 |
| HFCS[2] | 10.0 |
| Soybean oil[3] | 2.0 |
| Panalite ® SV[4] | 0.5 |
| Salt[5] | 2.0 |
| Dough Conditioner[6] | 1.5 |
| Compressed yeast[7] | 4.0 |
| Water | 60.0 |
| Total | 180.0 |

[1]Cargill "Progressive Baker Artisan Bread Flour", Cargill, Inc., MN
[2]IsoClear ™, Cargill, Inc., MN
[3]Cargill Soybean Salad Oil (soybean oil with citric acid as preservative), Cargill, Inc., MN
[4]ADM Arkady Panalite ® 50 SVK emulsifier, ADM, IL
[5]Evaporated food grade salt, United Salt Corp., TX
[6]S-500 conditioner, Puratos Corp., NJ
[7]Eagle, Lallemand, Inc., Montreal, Canada An approximately 1200 gram batch of dough was mixed in a Hobart mixer equipped with a McDuffey bowl for 1 minute on low speed and 8 minutes on medium speed. 480 grams of dough were scaled and placed in a Farinograph® instrument. Brabender units of this dough were recorded. The remainder of the dough was then allowed to rest for 10 minutes and four 160 gram pieces of dough were scaled. The dough was then allowed another 10 minute rest before the dough was sheeted and rolled with a Moline Bread Molder (final gap setting=1.5, pressure board setting=6). The dough was allowed to proof for 50 minutes and then baked 16 minutes at 400° F. Specific volume was determined by dividing the volume of the loaves by their weight after cooling for 1 hour. The following results (shown in Table 3) were obtained:

TABLE 3

Dough Rheology and Bake Data for Rheologically Balanced and Unbalanced Dough Systems

| High Fiber Bread Premix Composition (see formulas above) | Flour Replacement Level (%) | Brabender Units of Bread Dough After Mixing | Specific Volume (cc/g) of Finished Bread |
| --- | --- | --- | --- |
| Control (no premix) | 0 | 510 | 6.4 |
| aleurone, inulin, VWG[1] | 16 | 500 | 5.5 |
| aleurone, inulin, VWG | 34 | 520 | 4.6 |
| aleurone, VWG | 18 | 700 | 5.4 |
| aleurone, VWG | 34 | >700 | <3.0 |
| inulin, VWG | 13 | 380 | 5.1 |
| inulin, VWG | >13 | could not process | n.a. |

[1]Vital Wheat Gluten (made in Poland), Cargill, Inc., MN

As can been seen from the data in Table 3, the rheologically balanced high fiber blend of the present invention resulted in a dough that had substantially the same rheology as a control dough and therefore did not require significant adjustments to the water content of the formula or to the processing parameters, and resulted in a baked product having a desirable specific volume even at the "excellent source of fiber" level (34% flour replacement). The individual fiber ingredients, used alone in the dough formulation, did not result in acceptable doughs. Rheology of these doughs was affected dramatically with Brabender units of mixed doughs changing more than 100 than the control in all cases. This led to severe processing issues in some cases and made processing of the dough into a finished product impossible in one case (i.e., the last data set in Table 3 for the composition containing only inulin and VWG at levels greater than 13% flour replacement).

EXAMPLE 2

Cottonseed Fiber-Inulin Premix Composition

Using the methodology described above, another premix composition in accordance with the present invention was formulated as follows:

| Premix 2 Composition | |
| --- | --- |
| VWG | 25% |
| Cottonseed Fiber | 47% |
| Inulin-Standard | 28% |

Figure 7:
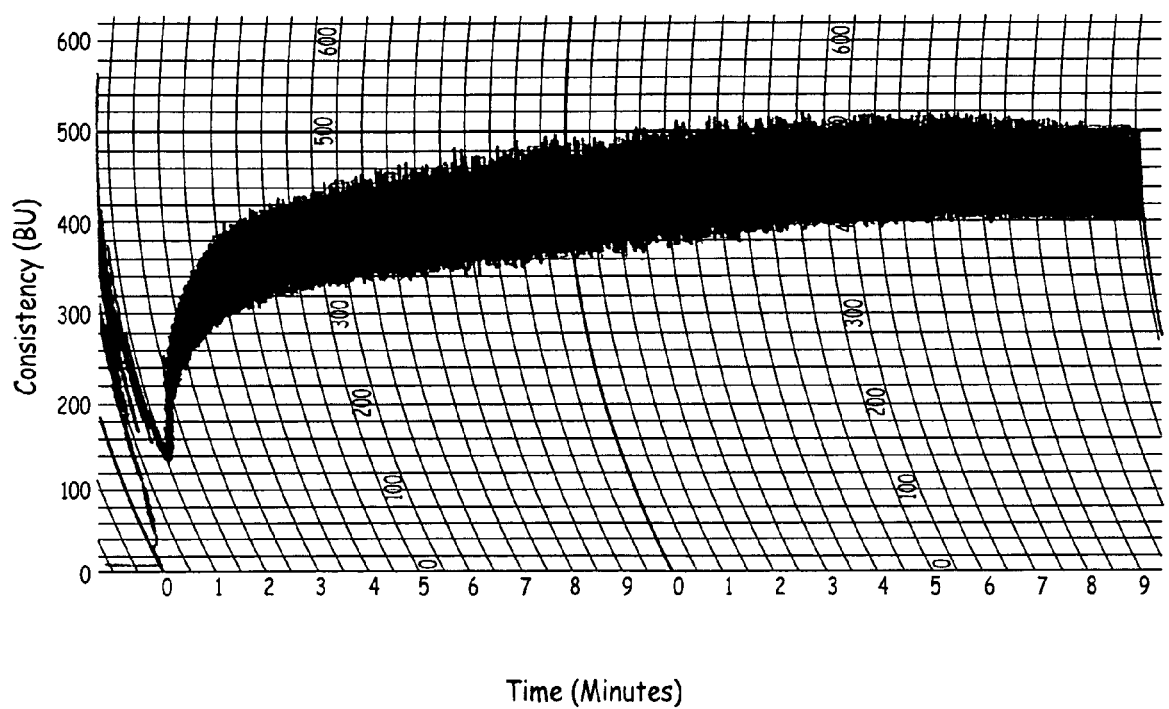
FIG. 7 is a Farinograph® curve of a dough made with 10% premix and 90% flour at 65% absorption, where the premix was a rheologically balanced blend of cottonseed fiber, inulin, and VWG.

The total dietary fiber content of this premix is about 61%. To produce a "good source of fiber"-containing bread, a manufacturer would replace 10% of the flour in the formula with this premix. To produce an "excellent source of fiber"-containing bread, the manufacturer would replace 20% of the flour in the formula with this premix. FIG. 7 shows the Farinograph® curve of a dough made with 10% of this premix and 90% flour at 65% absorption. As can be seen in FIG. 7, the dough made with this rheologically balanced premix has the desired Farinograph® curve at 500 BU.

| Premix 2 Composition with Inulin Removed | |
| --- | --- |
| VWG | 28% |
| Cottonseed | 72% |

Figure 8:
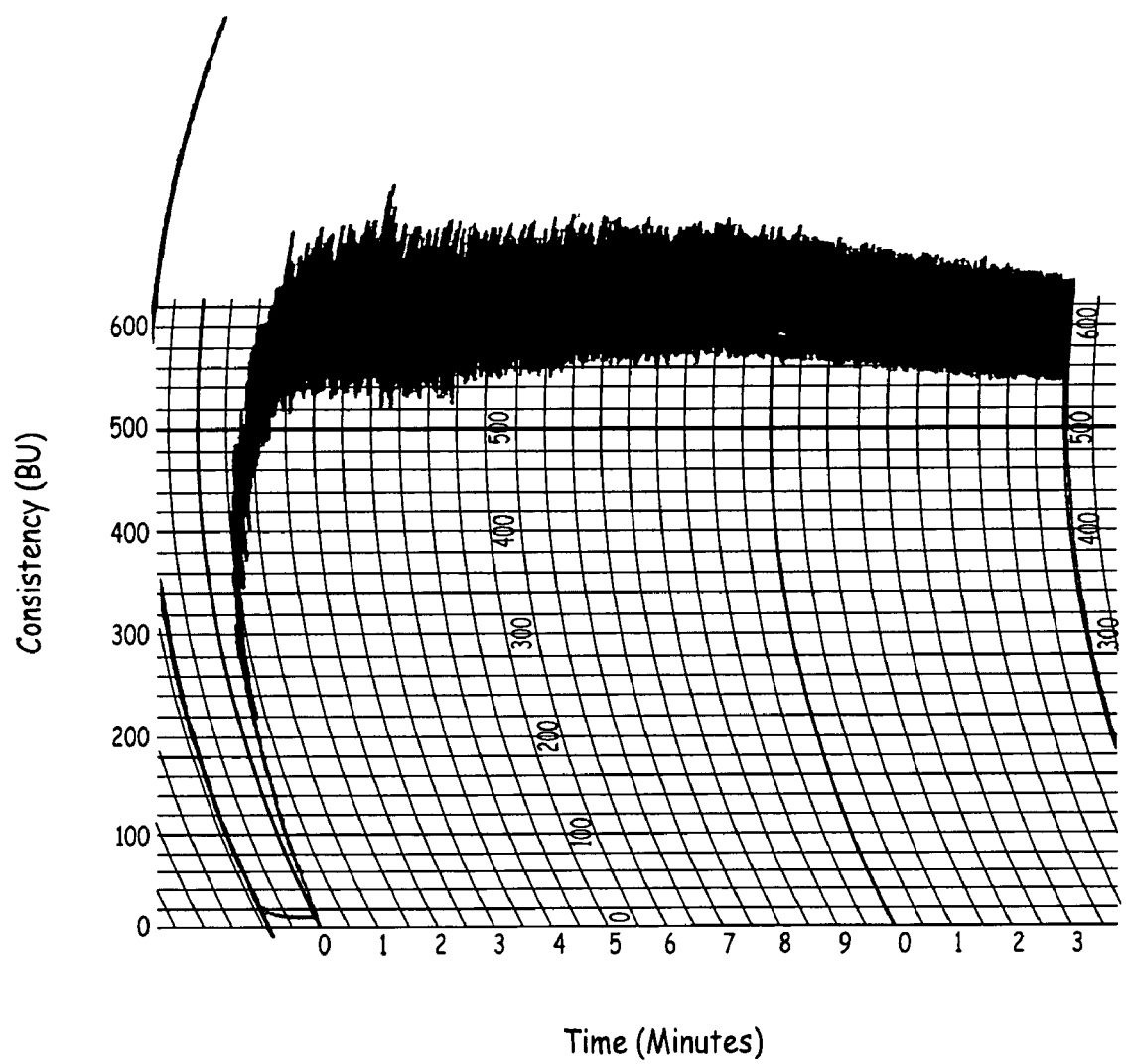
FIG. 8 is a Farinograph® curve of a dough made with 9.2% premix and 90.8% flour at 65% absorption, where the premix was a non-balanced blend of cottonseed fiber and VWG.

The total dietary fiber of this premix is 61%. To produce a "good source of fiber"-containing bread, the manufacturer would replace 9.2% of the flour in the formula with this premix. To produce an "excellent source of fiber"-containing bread, the manufacturer would replace 18.4% of the flour in the formula with this premix. FIG. 8 shows the Farinograph® curve of a dough made with 9.2% of this premix and 90.8% at 65% absorption. As seen in FIG. 8, the dough made with this non-balanced premix at a level needed to produce a "good source of fiber"-containing bread was not rheologically acceptable.

The results for the premix composition with the cottonseed removed are shown in FIG. 6 described above.

Bread was prepared with these rheologically balanced and non-balanced premixes using the general formula and procedures describes in Example 1A. Dough rheology and bake data for these evaluations is summarized in Table 4.

TABLE 4

Dough Rheology and Bake Data for Rheologically Balanced and Unbalanced Dough Systems (Cottonseed, inulin, VWG)

| High Fiber Bread Premix Composition (see formulas above) | Flour Replacement Level (%) | Brabender Units of Bread Dough After Mixing | Specific Volume (cc/g) of Finished Bread |
|---|---|---|---|
| Control (no premix) | 0 | 480 | 6.3 |
| Cottonseed fiber, inulin, VWG | 10 | 480 | 5.8 |
| Cottonseed fiber, inulin, VWG | 20 | 450 | 6.0 |
| Cottonseed fiber, VWG | 9.2 | 560 | 6.2 |
| Cottonseed fiber, VWG | 18.4 | 650 | 5.3 |
| Inulin, VWG | 13 | 380 | 5.1 |
| Inulin, VWG | >13 | could not process | n.a. |

As seen in Table 4, this rheologically balanced high fiber blend premix resulted in dough products that had nearly identical Farinograph® instrument data as the control product, and produced bread products with substantially similar specific volumes as that control product. The non-balanced premixes resulted in dough products that would require a substantial amount of processing adjustment in order to be commercially feasible.

EXAMPLE 3

Polydextrose-Psyllium Premix Composition

Figure 9:
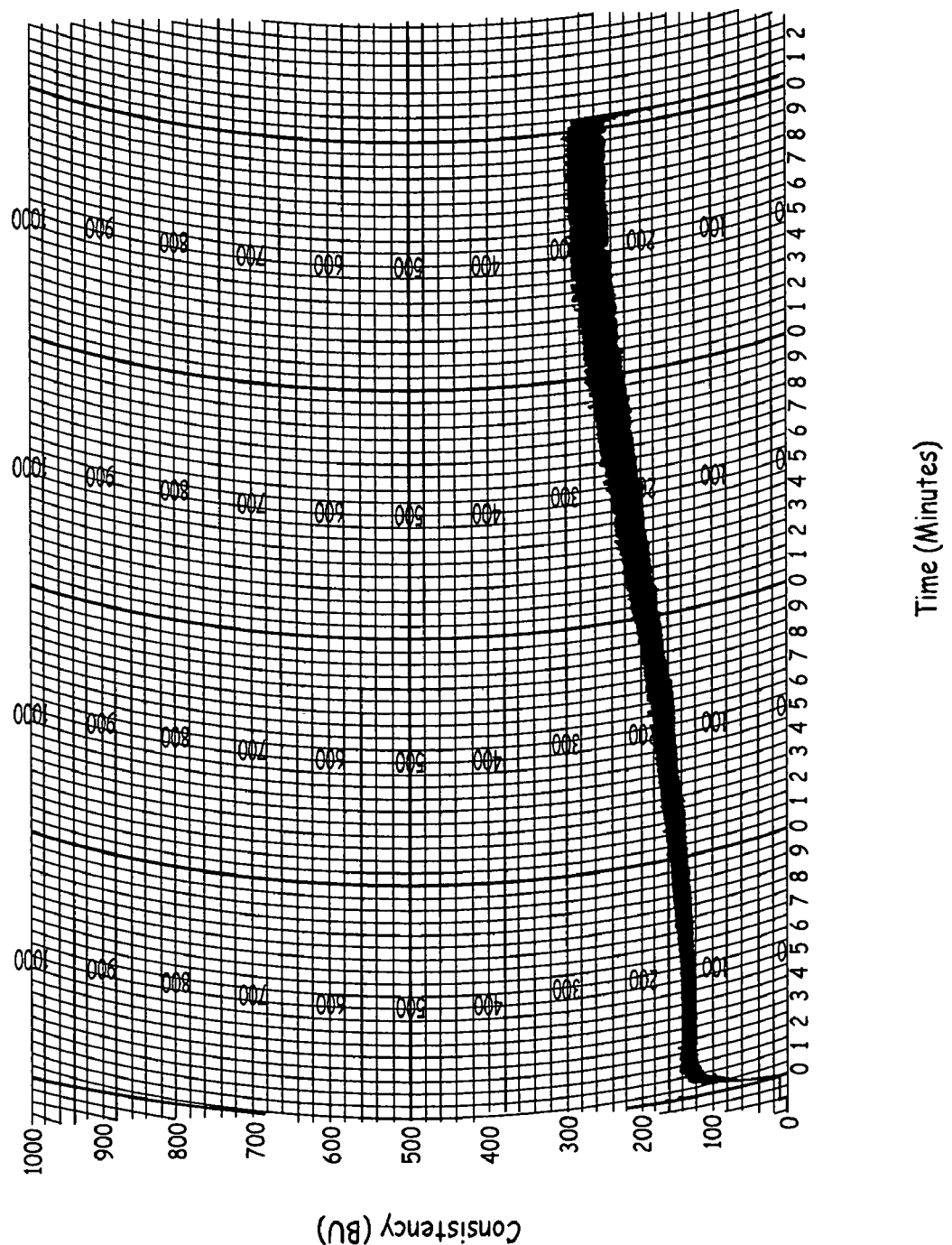
FIG. 9 is a Farinograph® curve of a dough made with 10% polydextrose and 90% flour at 69% absorption.
Figure 10:
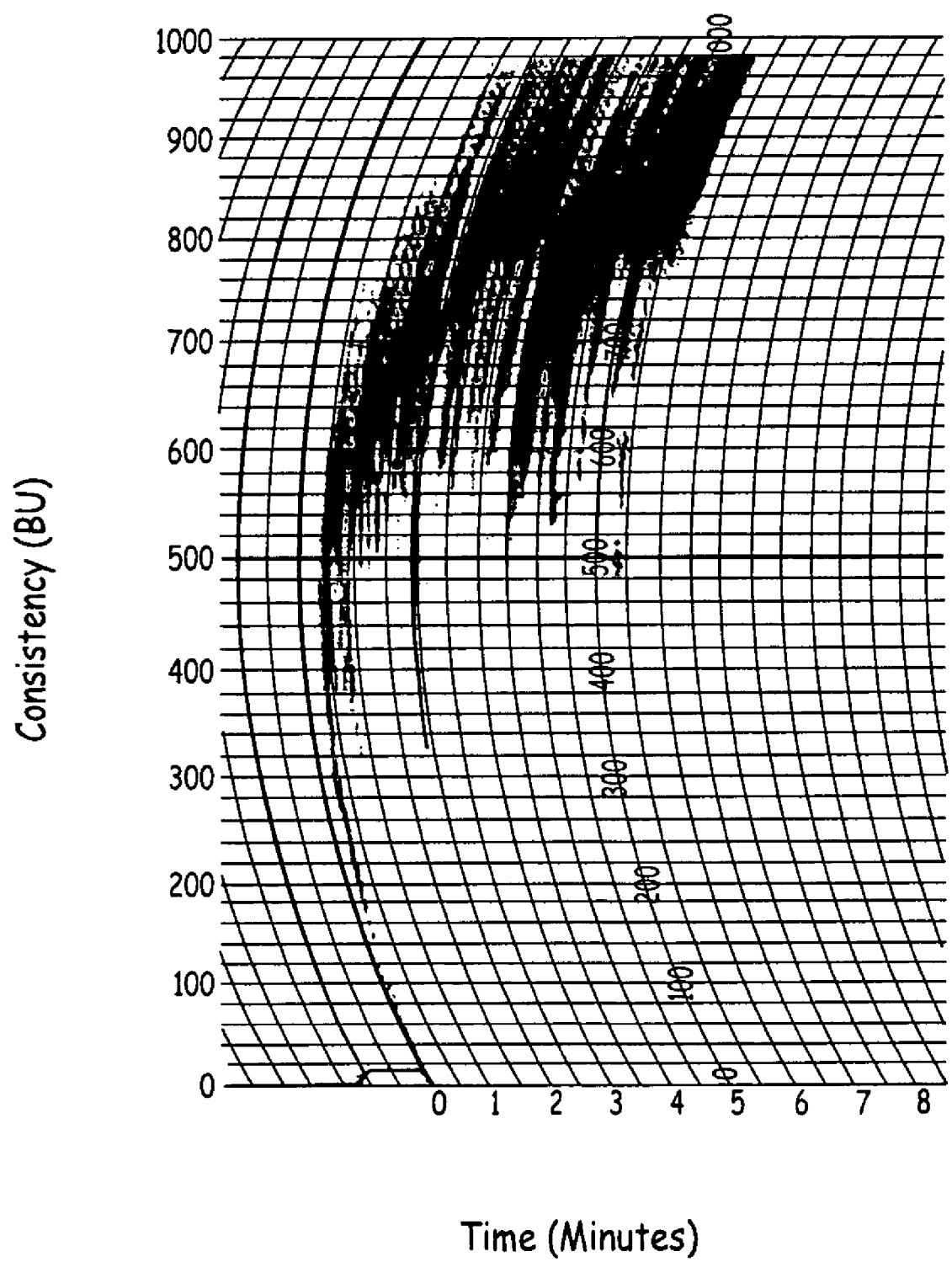
FIG. 10 is a Farinograph® curve of a dough made with 10% psyllium husk powder and 90% flour at 69% absorption.

In this example, two fiber ingredients with radical effects on dough rheology were chosen to develop a rheologically balanced high fiber premix. Polydextrose has a very strong plasticizing effect, while psyllium husk powder has a very strong stiffening effect, as shown in FIGS. 9 and 10 described below. In comparison, the Farinograph® curve of a control flour-water dough at 69% absorption would balance on the 500 BU line.

FIG. 9 shows a Farinograph® curve of a dough made with 10% polydextrose and 90% flour at 69% absorption. As seen in this Figure, the use of polydextrose results in a Farinograph® curve that is substantially lower than the reference line at 500 BU. This dough was soup-like in consistency.

FIG. 10 shows a Farinograph® curve of a dough made with 10% psyllium husk powder and 90% flour at 69% absorption. As seen in this Figure, the use of psyllium husk powder results in a Farinograph® curve that is significantly greater than the reference line at 500 BU. This dough was very hard and dry.

Consequently, using either of these fibers as the sole source of fiber in a high fiber bread formula would cause very significant rheology issues.

The following premix composed of psyllium, polydextrose and gluten was developed using the procedure described in Example 1.

| Premix 3 Composition | |
|---|---|
| VWG | 20% |
| Psyllium Husk Powder | 15% |
| Polydextrose | 65% |

The total dietary fiber of the premix is about 72%. To produce a "good source of fiber"-containing bread, the manufacturer would replace 10% of the flour in the formula with this premix. To produce an "excellent source of fiber"-containing bread, the manufacturer would replace 22% of the flour in the formula with this premix.

Figure 11:
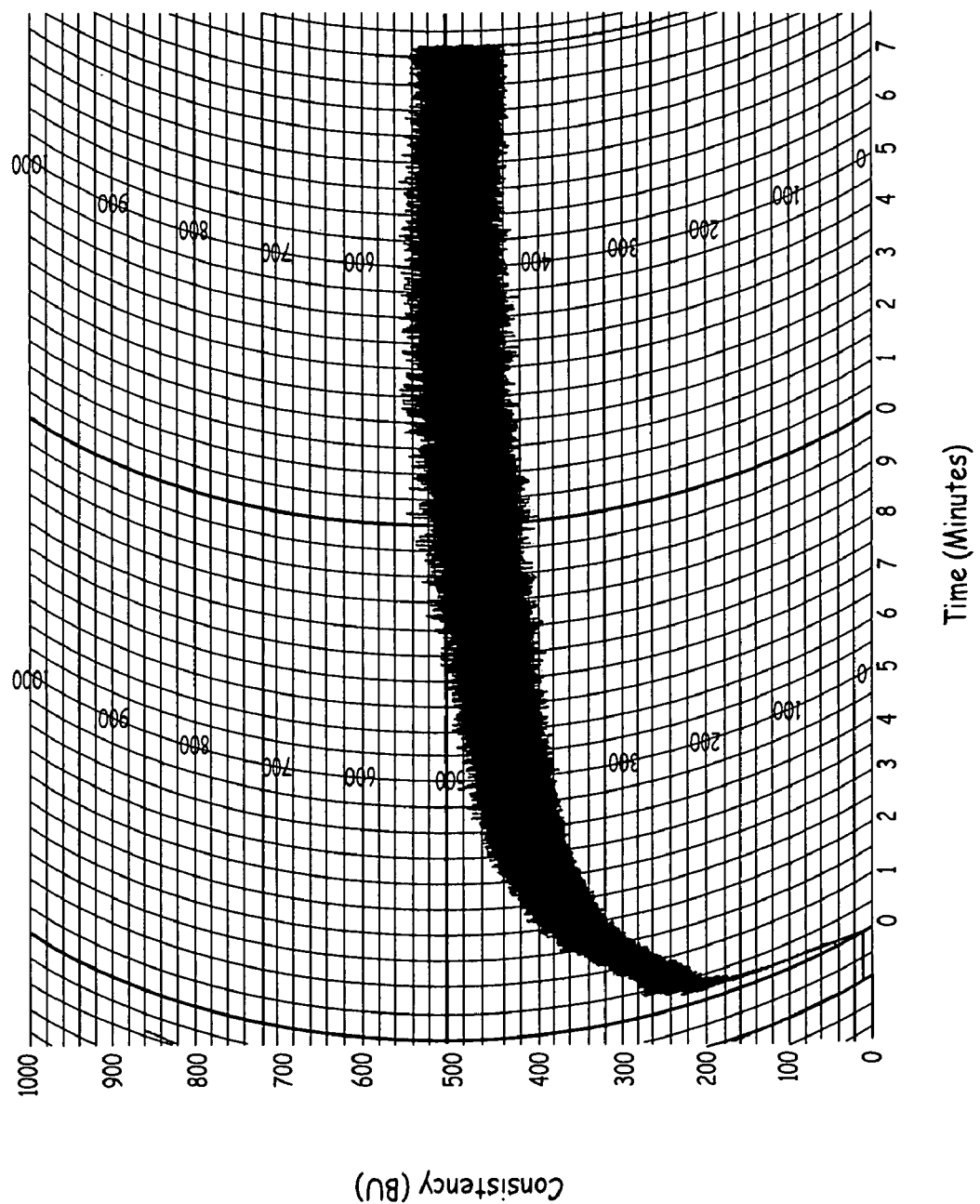
FIG. 11 is a Farinograph® curve of a dough made with 10% premix and 90% flour at 69% absorption, where the premix was a rheologically balanced blend of psyllium, polydextrose, and VWG.
Figure 12:
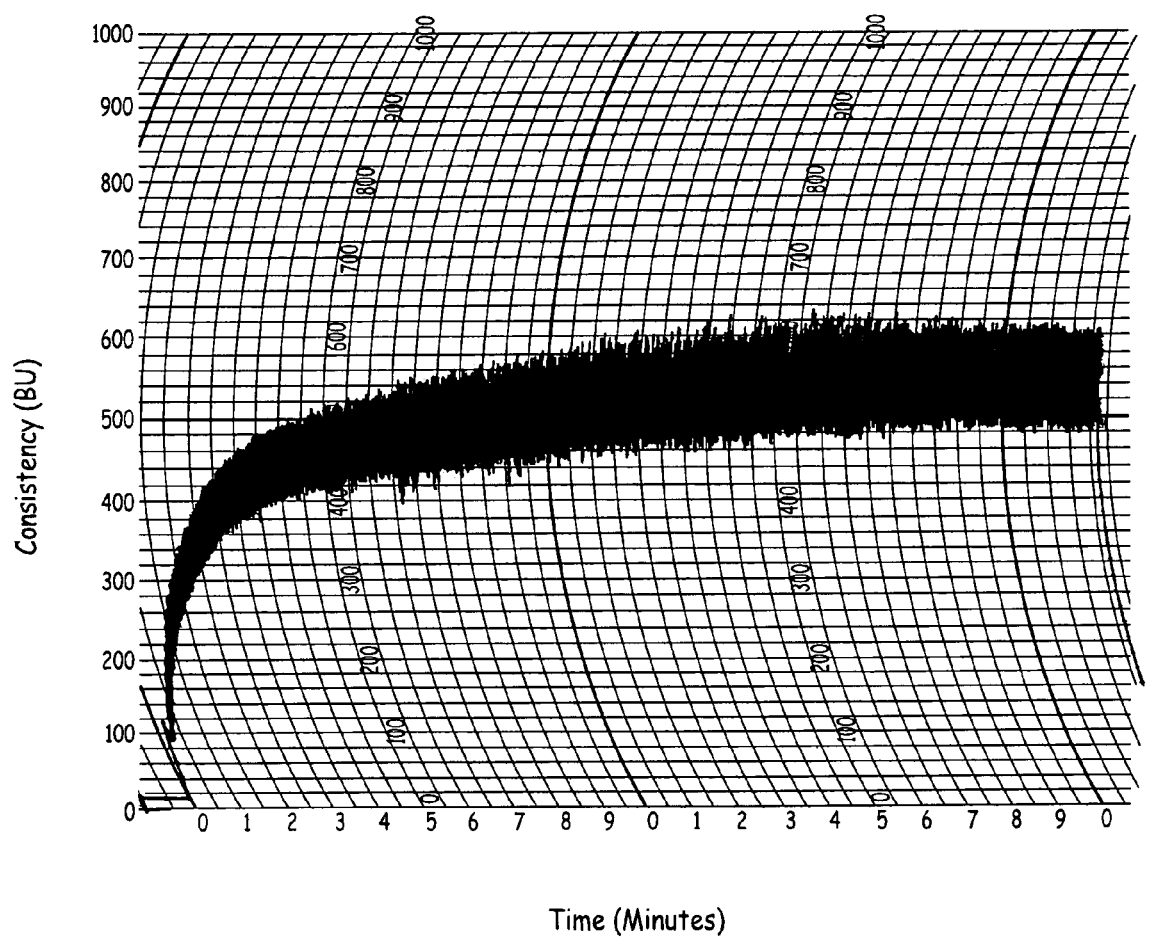
FIG. 12 is a Farinograph® curve of a dough made with 22% premix and 78% flour at 69% absorption, where the premix was a rheologically balanced blend of psyllium, polydextrose, and VWG.

FIG. 11 shows a Farinograph® curve of a dough made with 10% of the VWG/Psyllium/Polydextrose premix and 90% flour at 69% absorption. FIG. 12 shows a Farinograph® curve of a dough made with 22% of the VWG/Psyllium/Polydextrose premix and 78% flour at 69% absorption. As seen in these figures, despite the drastic adverse effects on dough rheology of the individual fiber components, by using the rheologically balanced high fiber blend premix of the present invention, a processable dough rheology can be achieved, with a Farinograph® curve near the 500 BU reference line.

Bread was produced with this premix using the general formula and procedures described in Example 1A. Dough rheology and bake data for these evaluations are contained in Table 5.

TABLE 5

Dough Rheology and Bake Data for Balanced Psyllium Husk Powder, Polydextrose, VWG Dough Systems

| High Fiber Bread Premix Composition (see formula above) | Flour Replacement Level (%) | Brabender Units Of Bread Dough After Mixing | Specific Volume (cc/g) of Finished Bread |
|---|---|---|---|
| Control (no premix) | 0 | 460 | 6.45 |
| Psyllium, polydextrose, VWG | 10 | 470 | 6.16 |
| Psyllium, polydextrose, VWG | 22 | 450 | 5.09 |

In this example, due to the drastic effects on dough rheology caused by each of psyllium and polydextrose individually, a bread dough was not prepared using just one of these ingredients as the fiber source due to anticipated damage to the processing equipment and overall lack of processability.

As can be seen in Table 5, even though psyllium and polydextrose, as individual fiber ingredients, have significant adverse effects on the dough rheology, when they are combined to make a rheologically balanced high fiber blend premix of the present invention, they can be used to make a dough product having processing attributes that are substantially the same as a control product, and final product attributes that are quite suitable for conventional bakery products.

Although the foregoing specification and examples fully disclose and enable the present invention, they are not intended to limit the scope of the invention, which is defined by the claims appended hereto.

What is claimed is:

1. A fiber blend for making a bakery product, the fiber blend comprising a first fiber source, a second fiber source, and vital wheat gluten, wherein the fiber blend provides to the bakery product a dietary fiber content of between about 5% by weight to about 40% by weight, and wherein a dough made with the fiber blend, and without changing a water volume from that of a control dough made without the fiber blend, has a peak resistance value that is within plus or minus 100 Brabender Units of a peak resistance value of the control dough,
wherein the first fiber source is arabinogalactan, inulin, polydextrose, gum arabic, resistant starch, or combinations thereof,
wherein the second fiber source is oilseed fiber, oat bran, corn bran, cereal aleurone, psyllium or combinations thereof,
wherein the bakery product resulting from using the fiber blend has a specific volume of at least about 4.0 cc/g, and
wherein the fiber blend is configured to replace flour in the control dough on a one-to-one replacement basis.

2. The fiber blend of claim 1, wherein the first fiber source is inulin.

3. The fiber blend of claim 1, wherein the first fiber source comprises a soluble fiber source.

4. The fiber blend of claim 1, wherein the second fiber source comprises an insoluble fiber source.

5. The fiber blend of claim 1, wherein the second fiber source comprises a soluble fiber source.

6. A premix for a bakery product comprising the fiber blend of claim 1.

7. The fiber blend of claim 1, wherein the oilseed fiber is cottonseed, soy, or sunflower fiber.

8. The fiber blend of claim 1, wherein the first fiber source is inulin or polydextrose.

9. The fiber blend of claim 1, wherein the second fiber source is cereal aleurone, cottonseed fiber or psyllium.

10. The fiber blend of claim 1, wherein the first fiber source is inulin and the second fiber source is cereal aleurone.

11. The fiber blend of claim 1, wherein the first fiber source is inulin and the second fiber source is cottonseed fiber.

12. The fiber blend of claim 1, wherein the first fiber source is polydextrose and the second fiber source is psyllium.

13. The fiber blend of claim 1 wherein the dough made with the blend has a peak resistance value that is within plus or minus 50 Brabender Units of a peak resistance value of the control dough.

14. The fiber blend of claim 1 wherein the dough made with the blend has a peak resistance value that is within plus or minus 25 Brabender Units of a peak resistance value of the control dough.

15. The fiber blend of claim 1,
wherein the vital wheat gluten in the fiber blend replaces flour-based protein in the control dough at between about 1% to about 2by weight for every 1% by weight reduction of the flour-based protein.

16. A fiber blend for making a bakery product, the fiber blend comprising a first fiber source, a second fiber source, and vital wheat gluten,
wherein the fiber blend provides to the bakery product a dietary fiber content of between about 5% by weight to about 40% by weight, and wherein a dough made with the fiber blend, and without changing a water volume from that of a control dough made without the fiber blend, has a peak resistance value that is within plus or minus 100 Brabender Units of a peak resistance value of the control dough,
wherein the first fiber source is inulin, polydextrose, or combinations thereof,
wherein the second fiber source is cottonseed fiber, cereal aleurone, psyllium, or combinations thereof,
wherein the bakery product resulting from using the fiber blend has a specific volume of at least about 4.0 cc/g, and
wherein the fiber blend is configured to replace flour in the control dough on a one-to-one replacement basis.

17. The fiber blend of claim 16, wherein the vital wheat gluten in the fiber blend replaces flour-based protein in the control dough at between about 1% to about 2% by weight for every 1% by weight reduction of the flour-based protein.

* * * * *